Nov. 26, 1940.   E. F. CHAMBLESS ET AL   2,222,653
TRAP
Filed Feb. 10, 1938
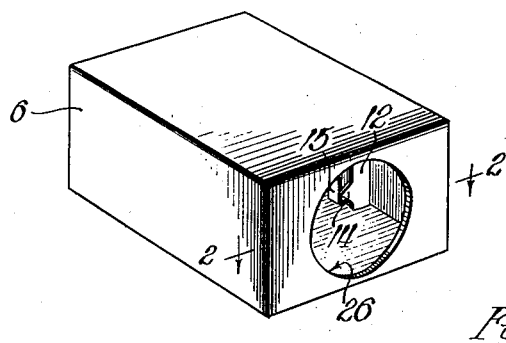
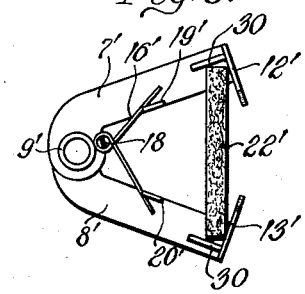
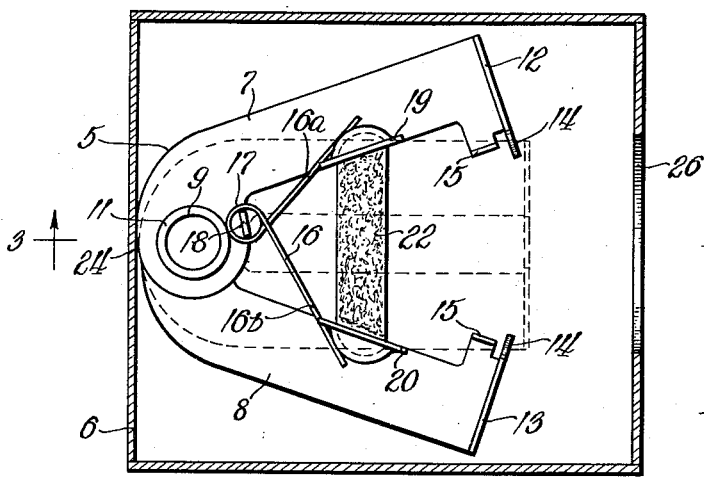
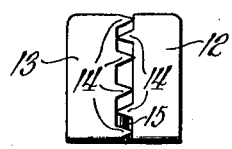
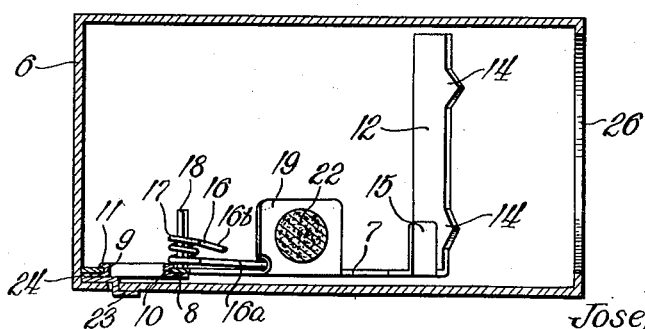
Inventors
Joseph W. Fay
Ersyl F. Chambless
By Brown, Jackson, Boettcher & Dienner
Attys.

Patented Nov. 26, 1940

2,222,653

UNITED STATES PATENT OFFICE 2,222,653

TRAP

Ersyl F. Chambless, Chicago, and Joseph W. Fay, Villa Park, Ill.; said Fay assignor to said Chambless Application February 10, 1938, Serial No. 189,750

12 Claims. (Cl. 43—94)

This invention relates to a trap for mice, rats, and the like.

One of the main objects of the invention is to provide a trap comprising an improved trap structure and a pasteboard, paper, or other simple and inexpensive container enclosing and within which the trap structure is concealed, the container and the trap structure being of such simple and inexpensive construction that the container and enclosed trap structure may be discarded or thrown away with the trapped rodent without removing same from the trap, and, in addition, providing a sanitary arrangement for trapping and killing the rodent, and the container concealing at least the engaged portion of the trapped rodent from view.

It is also an object of the invention to provide an improved trap structure in which the trapping and killing jaws are held cocked by positioning of the bait directly between the jaws or suitable lugs thereon and without latching arms, tripping fingers or the like.

Another object is to provide means for holding the trap structure in place within the container so that the trap may be cocked, baited, and positioned within the container at the place of manufacture or assembly, distributed to the dealers and sold to the public enclosed within the container, and cocked and baited.

Further objects and advantages of the invention will appear from the following detailed description taken in connection with the accompanying drawing, in which:

Figure 1 is a perspective view of one form of trap embodying the present invention;

Figure 2 is an enlarged horizontal section through the box or container of the trap taken on the line 2—2 of Figure 1, and with the enclosed trap structure in elevation;

Figure 3 is a fragmentary vertical section taken on the line 3—3 of Figure 2;

Figure 4 is a front end view of the trapping and killing jaws in closed position; and Figure 5 is a plan view of the internal trap structure showing a modified form of lugs between which the bait is positioned to hold the jaws cocked.

Referring now in detail to the drawing, the trap shown in Figures 1 to 4, inclusive, comprises a trap structure, indicated at 5, and a pasteboard, paper, or other inexpensive box or container 6 enclosing and within which the trap structure is concealed.

The trap structure comprises a pair of inexpensive metal stampings 7 and 8 constituting the trapping and killing jaws. One of these jaws, i. e., the lower jaw 8, has an integral hollow post 9 pressed up therefrom, and the other jaw 7 has an opening 10 which fits over the post 9, the jaw 7 being thereby pivoted to the jaw 8 upon the post 9 the upper end of which is spun over, as shown at 11. The outer ends of the jaws 7 and 8 are turned up at substantially right angles at 12 and 13, respectively, and these upturned portions are provided along their inner edges with sharply pointed teeth 14 which, when the jaws are snapped closed, engage the animal and trap and kill the same. The teeth 14 on one jaw are preferably staggered with respect to the teeth 14 on the other jaw as shown in Figure 4, and integral upturned stop lugs 15 are adapted to engage to stop or limit the closing movement of the jaws.

The jaws 7 and 8 are snapped closed by a spring 16 which has a coiled portion 17 mounted upon a lug 18 integral with and turned up from one edge of the jaw 7. The extending arms of the spring 16 engage lugs 19 and 20 integral with and turned up from the edges of the respective jaws 7 and 8, and the action of the spring tends to snap the jaws closed. The lug 18 upon which the spring 16 is mounted being on the same jaw 7 with the lug 19, the relation between the coiled portion 17 of the spring and the position of engagement of the spring arm 16a with the lug 19 is substantially the same in the open and closed positions of the jaws, but the lug 20 being on the other jaw, this lug has sliding movement along the spring arm 16b engaging the same in the opening and closing movements of the jaws.

The lugs 19 and 20 have depressions for receiving and holding the ends of the bait 22 which is shown in the form of a rigid stick of dough or food material with cheese or other appetizing or attractive material thereon. Upon opening the jaws 7 and 8 and positioning the bait 22 between the lugs 19 and 20, with the ends of the piece of bait engaging in the depressions in the lugs 19 and 20, the jaws 7 and 8 are held cocked or open as shown in Figure 2 directly by the piece of bait and without latching arms, tripping fingers, or the like.

A lug 23 engaged down through an opening in the bottom of the box or container 6, with the engagement of the back of the trap structure with the box or container at 24, holds the trap structure in position within the container so that the trap may be cocked, baited, and positioned within the box or container 6 at the place of manufacture or assembly, distributed to the dealers and sold to the public enclosed within the carton, and cocked and baited and with the carton sealed. If desired, instructions and any other printed matter may be placed upon the carton 6. We have found that the trap may be roughly handled without springing the cocked and baited trap structure enclosed within the container 6.

The front of the container 6 has an opening 26 through which the mouse or rat enters the container and into position between the jaws 7 and 8 and, nibbling upon bait 22, breaks the same and is trapped and killed by snapping of the toothed portions 12 and 13 of the jaws to closed position under the action of the spring 16. At least the engaged portion of the animal is concealed from view by the box or container 6, and the low cost of the box 6, formed of pasteboard, paper or the like, and the enclosed trap structure 5 permits the box and trap structure to be thrown away with the trapped and killed animal without removing same from the trap.

The form of trap structure shown in Figure 5 is the same as the trap structure shown in Figures 1 to 4, inclusive, except that instead of placing the bait 22' between lugs 19' and 20' with which the arms of spring 16' engage, the outer ends of the upturned toothed jaw portions 12' and 13' are turned back at 30 and the bait 22' is placed between the upturned toothed jaw portions 12' and 13' and the turned back portions 30 thereof as shown.

We do not intend to be limited to the precise details shown and described.

We claim:

1. A trap of the class described comprising a pair of metal stampings pivoted together and constituting trapping and killing jaws, the outer ends of said jaws being turned laterally and provided along their inner edges with pointed teeth, a pair of lugs turned laterally from one of said jaws, a spring having a coiled portion mounted upon one of said lugs and a pair of extending arms one of which has engagement with the other lug, and a lug turned laterally from the other jaw and having engagement with the other arm of said spring, said jaws being formed to receive a piece of bait directly therebetween and held cocked by the direct engagement of said bait with said jaws.

2. A trap of the class described comprising a pair of metal stampings pivoted together and constituting trapping and killing jaws, the outer ends of said jaws being turned laterally and provided along their inner edges with pointed teeth, a pair of lugs turned laterally from one of said jaws, a spring having a coiled portion mounted upon one of said lugs and a pair of extending arms one of which has engagement with the other lug, a lug turned laterally from the other jaw and having engagement with the other arm of said spring, and lugs turned back from the laterally turned outer ends of said jaws and adapted to receive a piece of bait directly therebetween and said jaws being held cocked by direct engagement of said bait between said lugs.

3. A trap of the class described comprising a pair of metal stampings pivoted together and constituting trapping and killing jaws, the outer ends of said jaws being turned laterally and provided along their inner edges with pointed teeth, a pair of lugs turned laterally from one of said jaws, a spring having a coiled portion mounted upon one of said lugs and a pair of extending arms one of which has engagement with the other lug, and a lug turned laterally from the other jaw and having engagement with the other arm of said spring, the lugs which engage said spring arms being formed to receive a piece of bait directly therebetween and said jaws being held cocked by direct engagement of said bait between said lugs.

4. A trap of the class described comprising a pair of metal stampings pivoted together and constituting trapping and killing jaws, the outer ends of said jaws being turned laterally and provided along their inner edges with pointed teeth, a pair of lugs turned laterally from one of said jaws, a spring having a coiled portion mounted upon one of said lugs and a pair of extending arms one of which has engagement with the other lug, a lug turned laterally from the other jaw and having engagement with the other arm of said spring, a container of fibrous material enclosing said trap and having an opening for entry of the rodent into the container into position between said jaws, and a lug turned laterally from one of said jaws and engaged through an opening in the bottom of the container for holding the trap structure in position within the container.

5. A trap of the class described comprising a pair of metal stampings pivoted together and constituting trapping and killing jaws, the outer ends of said jaws being turned laterally and provided along their inner edges with pointed teeth, a pair of lugs turned laterally from one of said jaws, a spring having a coiled portion mounted upon one of said lugs and a pair of extending arms one of which has engagement with the other lug, a lug turned laterally from the other jaw and having engagement with the other arm of said spring, said jaws being formed to receive a piece of bait directly therebetween and held cocked by the direct engagement of said bait between said jaws, a container enclosing said trap and having an opening for entry of the rodent into the container into position between said jaws, and a lug turned laterally from one of said jaws and engaged through an opening in the container for holding the trap structure in position within the container.

6. A trap of the class described comprising a pair of substantially flat and horizontally disposed metal stampings constituting trapping and killing jaws, a hollow post pressed up from one of said jaws and engaged in an opening in the other jaw with its upper end spun over pivotally to connect said jaws, the outer ends of said jaws being turned upwardly and provided along their inner edges with pointed teeth, a pair of lugs turned up from one of said jaws, a spring having a coiled portion mounted upon one of said lugs and a pair of extending arms one of which has relatively fixed engagement with the other lug, a lug turned up from the other jaw and having sliding engagement with the other arm of said spring, and stop lugs on said jaws for limiting closing movement thereof.

7. A trap of the class described comprising a pair of substantially flat and horizontally disposed metal stampings constituting trapping and killing jaws, a hollow post pressed up from one of said jaws and engaged in an opening in the other jaw with its upper end spun over pivotally to connect said jaws, the outer ends of said jaws being turned upwardly and provided along their inner edges with pointed teeth, a pair of lugs turned up from one of said jaws, a spring having a coiled portion mounted upon one of said lugs and a pair of extending arms one of which has relatively fixed engagement with the other lug, a lug turned up from the other jaw and having sliding engagement with the other arm of said spring, said jaws being formed to receive a piece of bait directly therebetween and held cocked by the direct engagement of said bait with said jaws, and stop lugs on said jaws for limiting closing movement thereof.

8. A trap of the class described comprising trapping and killing jaw means having open and closed positions and provided with spring means for tensioning the jaws, said jaw means when in open position being under spring tension adapted to snap the jaws to closed position, and a receptacle enclosing the trap and bait and having an opening for directing a rodent into the receptacle and to the trap, the trap, bait, and receptacle being adapted for distribution in assembled relation and with the jaw means of the trap held cocked in open position by the bait, said jaws being adapted to trap a rodent independently of the wall of said receptacle.

9. A method of trapping, killing, and disposing of rodents, which comprises placing a trap substantially wholly within a container having an opening for the entry of the rodent, directing the rodent to the trap by the opening in said container, trapping the rodent in said trap upon entry into the container and wholly independently of the wall of the container, and disposing of the rodent by discarding the container and trap without removing the rodent therefrom.

10. A trap of the class described comprising trapping and killing jaws having open and closed positions and provided with spring means for tensioning the jaws, said jaws when in open position being under spring tension adapted to snap the jaws to closed position, and bait holding means on the respective jaws for holding a piece of bait directly therebetween, said jaws being held cocked in open position by engagement of the bait between the bait holding means on said jaws.

11. A trap of the class described comprising trapping and killing jaw means having open and closed positions and provided with spring means for tensioning the jaws, said jaw means when in open position being under spring tension adapted to snap the jaws to closed position, and a cardboard-like receptacle wholly enclosing the trapping and killing jaw means and having an opening for directing a rodent into the receptacle and between said jaws, said jaws being operable to trap the rodent independently of the wall of said receptacle.

12. A trap of the class described comprising trapping and killing jaw means having open and closed positions and provided with spring means for tensioning the jaws, said jaw means when in open position being under spring tension adapted to snap the jaws to closed position, a cardboard-like receptacle wholly enclosing the trapping and killing jaw means and having an opening for directing a rodent into the receptacle and between said jaws, and means on said trapping and killing jaw means and engaging said receptacle for holding the trap in place therein, said jaws being operable to trap the rodent independently of the wall of said receptacle.

ERSYL F. CHAMBLESS.
JOSEPH W. FAY.